United States Patent
Thompson et al.

(10) Patent No.: US 10,430,269 B2
(45) Date of Patent: Oct. 1, 2019

(54) METHODS AND SYSTEMS FOR ROOT CAUSE ANALYSIS FOR ASSEMBLY LINES USING PATH TRACKING

(71) Applicant: Robert Bosch GmbH, Stuttgart (DE)

(72) Inventors: Jeffrey Keating Thompson, Palo Alto, CA (US); Michael Frankmann, Palo Alto, CA (US); Goktug Tankut Cinar, Palo Alto, CA (US); Carlos Eduardo Cunha, Palo Alto, CA (US); Prasanth Lade, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 325 days.

(21) Appl. No.: 15/407,743

(22) Filed: Jan. 17, 2017

(65) Prior Publication Data
US 2017/0206127 A1    Jul. 20, 2017

Related U.S. Application Data

(60) Provisional application No. 62/280,528, filed on Jan. 19, 2016.

(51) Int. Cl.
*G06F 11/07* (2006.01)
*G05B 23/02* (2006.01)

(52) U.S. Cl.
CPC ...... *G06F 11/0793* (2013.01); *G05B 23/0275* (2013.01); *G06F 11/079* (2013.01)

(58) Field of Classification Search
CPC .................................................. G06F 11/0793
See application file for complete search history.

(56) References Cited

U.S. PATENT DOCUMENTS 5,893,208 A    4/1999   Sasaki et al.
6,801,821 B2  10/2004   Madden et al.
(Continued)

OTHER PUBLICATIONS

Yang LE et al: "A novel method of analyzing quality defects due to human errors in engine assembly line", 2012 International Conference on Information Management, Innovation Management and Industrial Engineering, Oct. 20, 2012 (Oct. 20, 2012), pp. 154-157.

(Continued)

*Primary Examiner* — Manuel A Rivera Vargas
(74) *Attorney, Agent, or Firm* — Michael Best & Friedrich LLP

(57) ABSTRACT

Methods and systems for performing root cause analysis for an assembly line including a plurality of nodes using path tracking. One method includes receiving tracking data identifying a subset of the plurality of nodes processing a product produced by the assembly line and receiving approval data associated with the assembly line identifying whether each product produced by the assembly line fails an approval metric. The method also includes enumerating a plurality of paths through the assembly line based on the tracking data and determining a failure rate for each of the plurality of paths based on the approval data. In addition, the method includes identifying a malfunctioning path included in the plurality of paths based on the failure rate for each of the plurality of paths, identifying a malfunctioning node based on the malfunctioning path, and performing an automatic action to address the malfunctioning node.

20 Claims, 10 Drawing Sheets

(56) References Cited

U.S. PATENT DOCUMENTS

| | | |
|---|---|---|
| 6,898,553 B2 | 5/2005 | Minucciani et al. |
| 7,576,287 B2 | 8/2009 | Lo et al. |
| 7,660,641 B2 | 2/2010 | Bournas et al. |
| 7,818,085 B1 | 10/2010 | Chang |
| 2004/0068341 A1* | 4/2004 | Minucciani ............ B23K 26/03 700/110 |
| 2006/0150018 A1 | 7/2006 | Cousin et al. |
| 2011/0202227 A1 | 8/2011 | Zhang et al. |
| 2015/0326457 A1 | 11/2015 | Wu et al. |

OTHER PUBLICATIONS

Pfingsten T et al: "Feature Selection for Troubleshooting in Complex Assembly Lines", IEEE Transactions on Automation Science and Engineering, vol. 4, No. 3, Jul. 2007, pp. 465-469.
International Search Report for Application No. PCT/EP2017/050930 dated Apr. 10, 2017 (5 pages).

\* cited by examiner

| Part ID | Molding | Tool ID | Nest ID | Tester | Scrap |
|---|---|---|---|---|---|
| 1 | Molding_1 | Tool_1 | Nest_1 | Tester_1 | FALSE |
| 2 | Molding_1 | Tool_2 | Nest_2 | Tester_1 | FALSE |
| 3 | Molding_1 | Tool_1 | Nest_3 | Tester_1 | FALSE |
| 4 | Molding_2 | Tool_2 | Nest_4 | Tester_1 | FALSE |
| 5 | Molding_2 | Tool_1 | Nest_5 | Tester_2 | FALSE |
| 6 | Molding_2 | Tool_2 | Nest_6 | Tester_2 | TRUE |

FIG. 3

METHODS AND SYSTEMS FOR ROOT CAUSE ANALYSIS FOR ASSEMBLY LINES USING PATH TRACKING

RELATED APPLICATIONS

This application claims priority to U.S. Provisional Application No. 62/280,528, filed Jan. 19, 2016, the entire content of which is herein incorporated by reference.

FIELD

Embodiments described herein relate to systems and methods for performing root cause analysis for assembly lines.

BACKGROUND

Manufacturing and assembly lines (collectively referred to assembly lines herein) often include a number of nodes and parts. The nodes perform work on one or more parts, such as by supplying a part, collecting or nesting and feeding a part, testing a part, connecting two parts together, surface treating a part, and the like. A malfunctioning node (sometimes referred to as a "bad" node) may cause a product produced by the assembly line to fail one or more approval metrics (thus, often referred to as a "failed" product), which may cause the product to be scrapped representing a financial loss for the manufacturer.

SUMMARY

Identifying a malfunctioning node in an assembly line is difficult. For example, a first node may provide bad input to a second node in a subsequent level of an assembly line, which may cause the second node to erroneously appear as a malfunctioning node. Furthermore, identifying a malfunctioning node often involves expert, human analysis that must be re-established for each new product, part, node, and the like.

Accordingly, embodiments described herein provide root cause analysis for assembly lines based on interactions between nodes. For example, embodiments described herein may detect malfunctioning nodes in an assembly line (e.g., nodes needing repair, replacement, or adjustment) by tracking the paths taken by failed products through the assembly line.

For example, one embodiment provides a method of performing root cause analysis for an assembly line including a plurality of nodes. The method includes receiving tracking data collected by one or more tracking sensors associated with the assembly line and receiving approval data associated with the assembly line. The tracking data identifies a subset of the plurality of nodes processing a product produced by the assembly line, and the approval data identifies whether each product produced by the assembly line fails an approval metric. The method also includes enumerating, with an electronic processor, a plurality of paths through the assembly line based on the tracking data, and determining, with the electronic processor, a failure rate for each of the plurality of paths based on the approval data. In addition, the method includes identifying, with the electronic processor, a malfunctioning path included in the plurality of paths based on the failure rate for each of the plurality of paths, identifying, with the electronic processor, a malfunctioning node based on the malfunctioning path, and performing an automatic action to address the malfunctioning node.

Another embodiment provides a system for performing root cause analysis for an assembly line including a plurality of nodes. The system includes a database and a computing device. The computing device includes an interface for communicating with the database, a computer-readable medium for storing instructions, and an electronic processor for executing the instructions stored in the computer-readable medium. The electronic processor executes the instructions stored in the computer-readable medium to (i) receive, from the database through the interface, tracking data from one or more tracking sensors associated with the assembly line, the tracking data identifying a subset of the plurality of nodes processing a product produced by the assembly line, (ii) receive, from the database through the interface, approval data associated with the assembly line, the approval data identifying whether each product produced by the assembly line fails an approval metric, (iii) determine based on the tracking data, for each of a plurality of edges connecting the plurality of nodes, a first number of products produced by the assembly line passing through the edge, (iv) determine based on the approval data, for each of the plurality of edges, a second number of products product by the assembly line passing through the edge and failing the approval metric, (v) determine, for each of the plurality of edges, a score based on the first number for the edge and the second number for the edge, (vi) identify a malfunctioning node included in the plurality of nodes based on the score for each of the plurality of edges, and (vii) perform an automatic action to address the malfunctioning node.

Another embodiment provides another method of performing root cause analysis for an assembly line including a plurality of nodes. The method includes receiving tracking data from one or more tracking sensors associated with the assembly line, the tracking data identifying a subset of the plurality of nodes processing a product produced by the assembly line and receiving approval data associated with the assembly line, the approval data identifying whether each product produced by the assembly line fails an approval metric. The method also includes determining based on the tracking data, with an electronic processor, for each of a plurality of edges connected to at least one of the plurality of nodes, a first number of products produced by the assembly line passing through the edge and determining based on the approval data, with the electronic processor, for each the plurality of edges a second number of products produced by the assembly line passing through the edge and failing the approval metric. In addition, the method includes determining, with the electronic processor, for each of the plurality of edges, a first score based on the first number of the edge and the second number of the edge and determining, with the electronic processor, for each of the plurality of nodes, a second score based on the first score associated with at least one edge connected to the node. The method also includes identifying, with the electronic processor, a malfunctioning node included in the plurality of nodes based on the second score for each of the plurality of nodes, and performing an automatic action to address the malfunctioning node.

Other aspects of the invention will become apparent by consideration of the detailed description and accompanying drawings.

BRIEF DESCRIPTION OF THE DRAWINGS

FIG. 3 illustrates example tracking data for an assembly line.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention.

Figure 1:
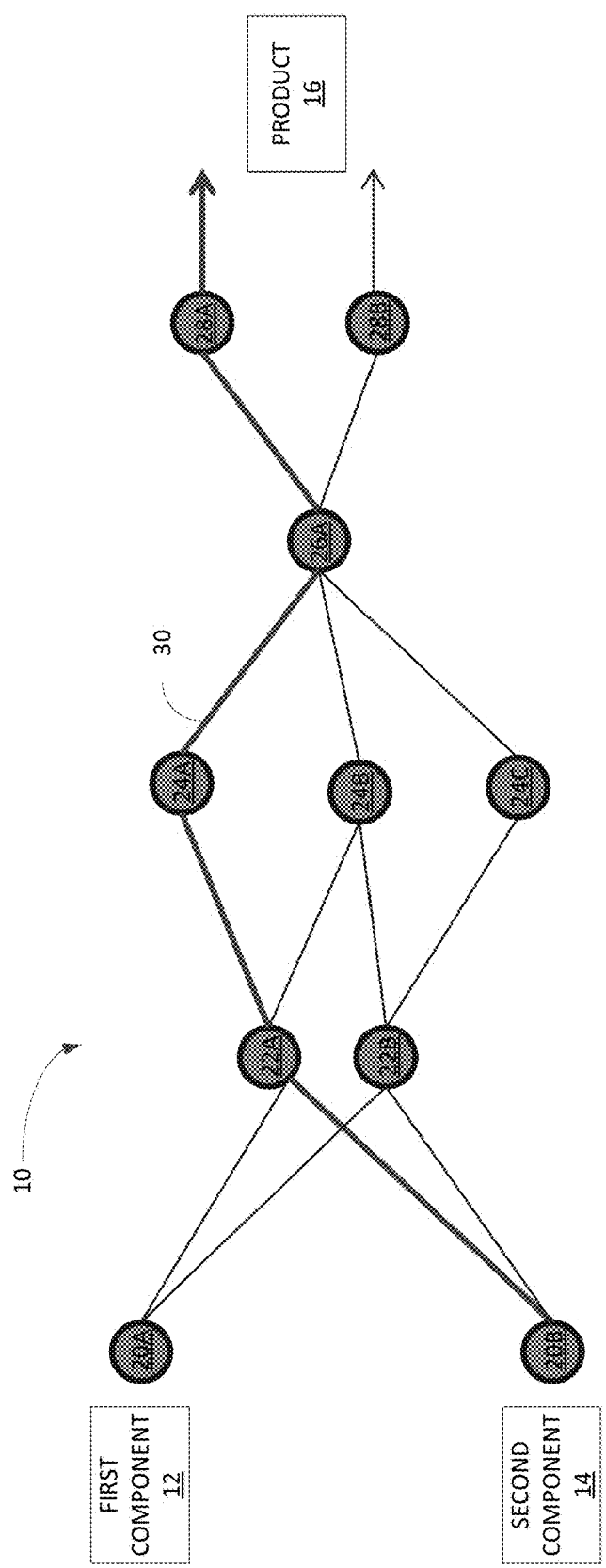
FIG. 1 schematically illustrates an assembly line producing a product.

FIG. 1 schematically illustrates an assembly line 10. It should be understood that the assembly line 10 illustrated in FIG. 1 is provided as one example of an assembly line, and the embodiments described herein may be used with any type of assembly line and are not limited to the example assembly line 10 illustrated in FIG. 1.

As illustrated in FIG. 1, the assembly line 10 receives a first component 12 and a second component 14 as input and produces a product 16 at an end of the assembly line 10. The assembly line 10 also includes a plurality of nodes that are used to convert the first component 12 and the second component 14 into the product 16. For example, as illustrated in FIG. 1, the assembly line 10 includes five stages of production for the product 16 and each stage includes one or more nodes. The first stage (i.e., a supply stage) includes a plurality of first nodes 20A and 20B. A second stage (i.e., an attachment stage) includes a plurality of second nodes 22A and 22B. A third stage (i.e., a collection stage) includes a plurality of third nodes 24A, 24B, and 24C. A fourth stage (i.e., a finishing stage) includes a fourth node 26A. A fifth stage (i.e., a testing stage) includes a plurality of fifth nodes 28A and 28B.

In the first stage, each of the plurality of first nodes 20A and 20B supplies a first component 12 or a second component 14 to one of a plurality of second nodes 22A and 22B via edges (illustrated in FIG. 1 as lines connecting nodes) between the plurality of first nodes 20A and 20B and the plurality of second nodes 22A and 22B. Each of the plurality of second nodes 22A and 22B attaches the first component 12 to the second component 14 to create a new composite part. The composite parts provided by the plurality of second nodes 22A and 22B are collected in the plurality of third nodes 24A, 24B, and 24C. The plurality of third nodes 24A, 24B, and 24C acts as a temporary repository for the composite parts until they are supplied to the fourth node 26A. The fourth node 26A applies a finishing coating or surface to the composite part and moves the composite part to one of the plurality of fifth nodes 28A and 28B, which tests the received composite. For example, each of the plurality of fifth nodes 28A and 28B may test a received composite part by taking one or more measures of the composite part (e.g., size, shape, color, temperature, position, and the like). The measurements may be used to determine whether the composite part passes or fails one or more approval metrics. When the measurements do not satisfy the approval metrics, the composite part fails the metric. Conversely, when the measurements satisfy one or more of the approval metrics, the composite part may pass the metric. In some embodiments, composite parts failing the approval metric are scrapped.

As illustrated in FIG. 1, a stage of the assembly line 10 may include one or a plurality of nodes. Therefore, a product 16 produced by the assembly line may be produced along one of a plurality of paths through the assembly line 10. A particular path through the assembly line 10 may be represented by a sequence of nodes and edges connecting the nodes included in the sequence. For example, as illustrated in FIG. 1, a product 16 produced by the assembly line 10 may be produced along a path 30 through the assembly line 10. The path 30 may be made up of a subset of the plurality of nodes connected by a plurality of edges, wherein each edge is connected to at least one node included in the subset.

Each node in the assembly line has an input side (i.e., a portion of the assembly line 10 positioned before the node) and an output side (i.e., a portion of the assembly line 10 positioned after the node). Similarly, each node may have one or more edges connected to the node on an input side (i.e., input edges) and one or more edges connected to the node on the output side (i.e., output edges). Also, a node may have one or more nodes that are positioned before the node on the input side (i.e., input nodes) and one or more nodes that are positioned after the node on the output side (i.e., output nodes). Furthermore, as described herein, a node positioned in a stage of the assembly line 10 immediately before or immediately after a node may be considered a neighboring node.

When a node included in the assembly line 10 malfunctions (often referred to as a "bad" node), a product 16 produced along a path including the malfunctioning node may not pass the one or more approval metrics at the testing stage (often referred to as a "failed" product), which often causes the product 16 to be scrapped. However, as noted above, properly identifying a malfunctioning node is difficult. For example, a first node may provide bad input to a second node in a subsequent stage of the assembly line 10, which may cause the second node to erroneously appear as a malfunctioning node rather than the first node. Furthermore, identifying a malfunctioning node often involves expert, human analysis that must be re-established for each new product, part, node, and the like.

Figure 2:
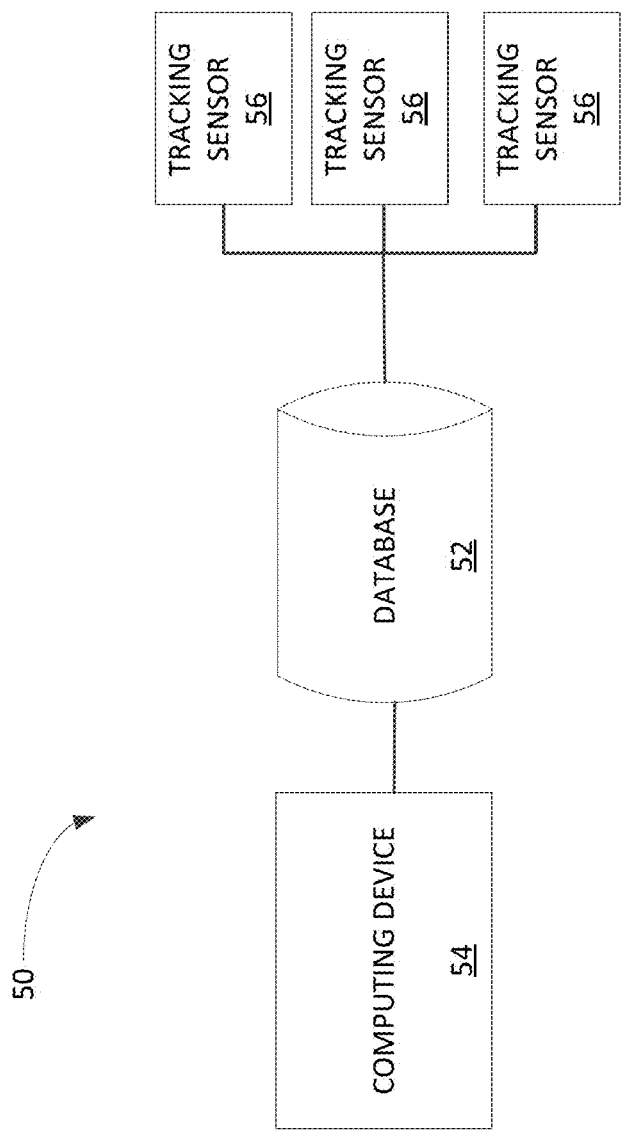
FIG. 2 schematically illustrates a system for performing root cause analysis of the assembly line of FIG. 1.

Accordingly, FIG. 2 schematically illustrates a system 50 for performing root analysis of an assembly line according to one embodiment that provides a technical solution to at least the above technical problems. As illustrated in FIG. 2, the system 50 includes a database 52 (e.g., a manufacturing execution system ("MES") database), a computing device 54, and one or more tracking sensors 56. It should be understood that the system 50 may include different components than illustrated in FIG. 2. For example, in some embodiments, the system 50 may include multiple databases 52, multiple computing devices 54, fewer or additional tracking sensors 56, or a combination thereof. Also, in some embodiments, the database 52 may be included in the computing device 54.

The database 52 receives and stores data from the tracking sensors 56. The database 52 may communicate with the tracking sensors 56 over a wired connection, a wireless connection, or a combination thereof. For example, in some embodiments, the database 52 may communicate with some of the tracking sensors 56 over a wired connection and may communicate with some of the tracking sensors 56 over a wireless connection. In some embodiments, when the database 52 communicates with one or more of the tracking sensors 56 over a wireless connection, the wireless network may include the Internet, a mesh network, a cellular network, a private network, a public network, or a combination thereof. Also, in some embodiments, one or more intermediary devices may manage communication between the tracking sensors 56 and the database 52. For example, one or more intermediate devices may communicate with the tracking sensors 56 and forward data received from the tracking sensors 56 to the database 52 (e.g., with or without processing). In particular, in some embodiments, the tracking sensors 56 may communicate with the computing device 54, and the computing device 54 may forward data received from the tracking sensors 56 (e.g., with or without processing) to the database 52.

Each tracking sensor 56 may be associated with (e.g., positioned near to) one or more nodes included in an assembly line. For example, using the example assembly line 10 illustrated in FIG. 1, a tracking sensor 56 may be associated with each of the plurality of nodes included in the assembly line 10. The tracking sensors 56 track parts processed by the plurality of nodes. In some embodiments, the tracking systems 56 may include an image sensor (e.g., a camera), a barcode reader, a radio frequency receiver, and the like. For example, parts input into an assembly line may be assigned a unique identifier. In some embodiments, the unique identifier is included in a part as a barcode, a radio frequency tag, human-readable text, or another form readable by a tracking sensor 56. Accordingly, as a part is input into one of the plurality of nodes of the assembly line, a tracking sensor 56 reads the unique identifier and transmits the unique identifier to database 52 linked with an identifier of the node processing the part. In some embodiments, a tracking sensor 56 transmits additional data to the database 52, such as data regarding the node, time and date data, measurement data for the part, and the like. The database 52 stores the data from the tracking sensors 56 as tracking data that identifies a subset of the plurality of nodes producing a particular product 16. Accordingly, the tracking data may be used to identify a path followed by a product 16 through the assembly line 10. For example, FIG. 3 illustrates one example of tracking data. The illustrated tracking data indicates a path through an assembly line. In particular, "Part ID" 2 passed through a first molding node ("Molding_1"), a second tool node ("Tool 2"), a second nest node ("Node 2"), and first test node ("Tester_1"). As illustrated in FIG. 3, in some embodiments, the tracking data includes or is linked to approval data for products produced by an assembly line. The approval data indicates whether a product produced by an assembly line passed or failed one or more approval metrics for the assembly line. For example, as illustrated in FIG. 3, the tracking data may identify whether each part tracked through the assembly line failed (i.e., "Scrap" is set to "TRUE") or passed (i.e., "Scrap" is set to "FALSE") one or more approval metrics of the assembly line.

In some embodiments, one or more of the nodes included in an assembly line may also communicate with the database 52 (e.g., over a wired or wireless connection). For example, in some embodiments, a tracking sensor 56 is included in a node of the assembly line 10. In particular, as described for the example assembly line 10, each of the fifth nodes 28A and 28B may include one or more sensors for taking a measurement of a composite part, and the fifth nodes 28A and 28B may transmit these measurements to the database 52 for storage. Also, in some embodiments, each of the fifth nodes 28A and 28B may be configured to compare measurements to one or more approval metrics and transmit approval data to a database for storage (i.e., data indicating whether the product 16 passes or fails one or more approval metrics). Alternatively or in addition, the database 52 may be configured to generate the approval data based on data received from the nodes, the tracking sensors 56, or a combination thereof (e.g., by comparing received measurements to one or more approval metrics). Furthermore, in some embodiments, the computing device 54 generates the approval data based on data received from the nodes, the tracking sensors 56, or the database 52.

As illustrated in FIG. 2, the database 52 also communicates with the computing device 54. The database 52 may communication with the computing device 54 over a wired connection, a wireless connection, or a combination thereof. For example, in some embodiments, the database 52 communicates with the computing device 54 over a wireless communication network, such as the Internet, a mesh network, a cellular network, a private network, a public network, or a combination thereof. Also, in some embodiments, one or more intermediary devices may manage communication between the computing device 54 and the database 52. For example, one or more intermediary devices may communicate with the computing device 54 and forward data received from the computing device 54 to the database 52 and vice versa (e.g., with or without processing). Also, as noted above, in some embodiments, the database 52 is included in the computing device 54.

Figure 4:
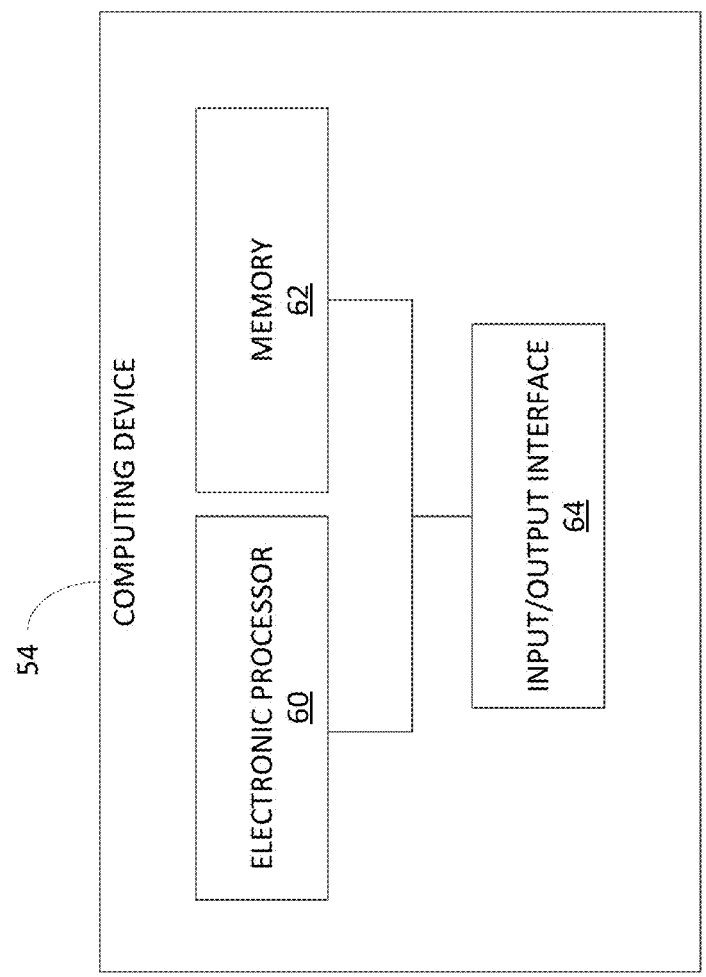
FIG. 4 schematically illustrates a computing device included in the system of FIG. 2.

The computing device 54 includes a plurality of electrical and electronic components that provide power, operational control, and protection of the components within the computing device 54. For example, as illustrated in FIG. 4, the computing device 54 may include an electronic processor 60 (e.g., a microprocessor or another suitable programmable device), non-transitory computer-readable medium 62 (e.g., a computer-readable storage medium), and an input/output interface 64. The electronic processor 60, the computer-readable medium 62, and the input/output interface 64 communicate over one or more control or data connections or buses. It should be understood that the computing device 54 illustrated in FIG. 4 represents one example of a computing device 54 and embodiments described herein may include computing devices with additional, fewer, or different components than the computing device 54 illustrated in FIG. 4. Also, in some embodiments, the computing device 54 performs functionality in addition to the functionality described herein.

The computer-readable medium 62 of the computing device 54 may include a program storage area and a data storage area. The program storage area and the data storage area may include read-only memory ("ROM"), random access memory ("RAM") (e.g., dynamic RAM ("DRAM"), synchronous DRAM ("SDRAM"), etc.), electrically erasable programmable read-only memory ("EEPROM"), flash memory, a hard disk, a secure digital ("SD") card, other suitable memory devices, or a combination thereof. The electronic processor 60 executes computer-readable instructions ("software") stored in the computer-readable medium 62. The software may include firmware, one or more applications, program data, filters, rules, one or more program modules, and other executable instructions. For example, the software may include instructions for and associated data for performing root cause analysis as described herein.

The input/output interface 64 allows the computing device 54 to communicate with devices external to the computing device 54. For example, the computing device 54 may communicate with the database 52 through the input/output interface 64. In particular, the input/output interface 64 may include a port for receiving a wired connection to the database 52 (e.g., a universal serial bus ("USB") cable and the like), a transceiver for establishing a wireless connection to the database 52 (e.g., over a communication network, such as the Internet, a local area network ("LAN"), a wide area network, and the like), or a combination thereof. Furthermore, in some embodiments, the computing device 54 may communicate with the tracking sensors 56 through the input/output interface 64. In some embodiments, the computing device 54 also receives input from one or more peripheral devices, such as a keyboard, a pointing device (e.g., a mouse), buttons on a touch screen, a scroll ball, mechanical buttons, and the like through the input/output interface 64. Similarly, in some embodiments, the computing device 54 provides output to one or more peripheral devices, such as a display device (e.g., a cathode-ray tube ("CRT"), a liquid crystal display ("LCD"), a touch screen, and the like), a printer, a speaker, and the like through the input/output interface 64. In some embodiments, output may be provided within a graphical user interface ("GUI") (e.g., generated by the electronic processor 60 from instructions and data stored in the computer-readable medium 62 and presented on a touch screen or other display) that enables a user to interact with the computing device 54.

The computing device 54 (i.e., the electronic processor 60) executes instructions (e.g., stored in the computer-readable medium 62) to perform root cause analysis for an assembly line. In particular, the computing device 54 (i.e., the electronic processor 60) executes instructions to perform the methods illustrated in FIGS. 5 and 6. The methods are described in terms of performing root cause analysis for the assembly line 10, which, as noted above, includes a plurality of nodes that produces a product 16. It should be understood, however, that the assembly line 10 is merely provided as an example, and the methods may be applied to any type of assembly line and is not limited to the assembly line 10 illustrated in FIG. 1. For example, the methods may be used with assembly lines that include fewer, additional, or different input, nodes, paths, edges, stages, and outputs (i.e., products) than the assembly line 10.

Figure 5:
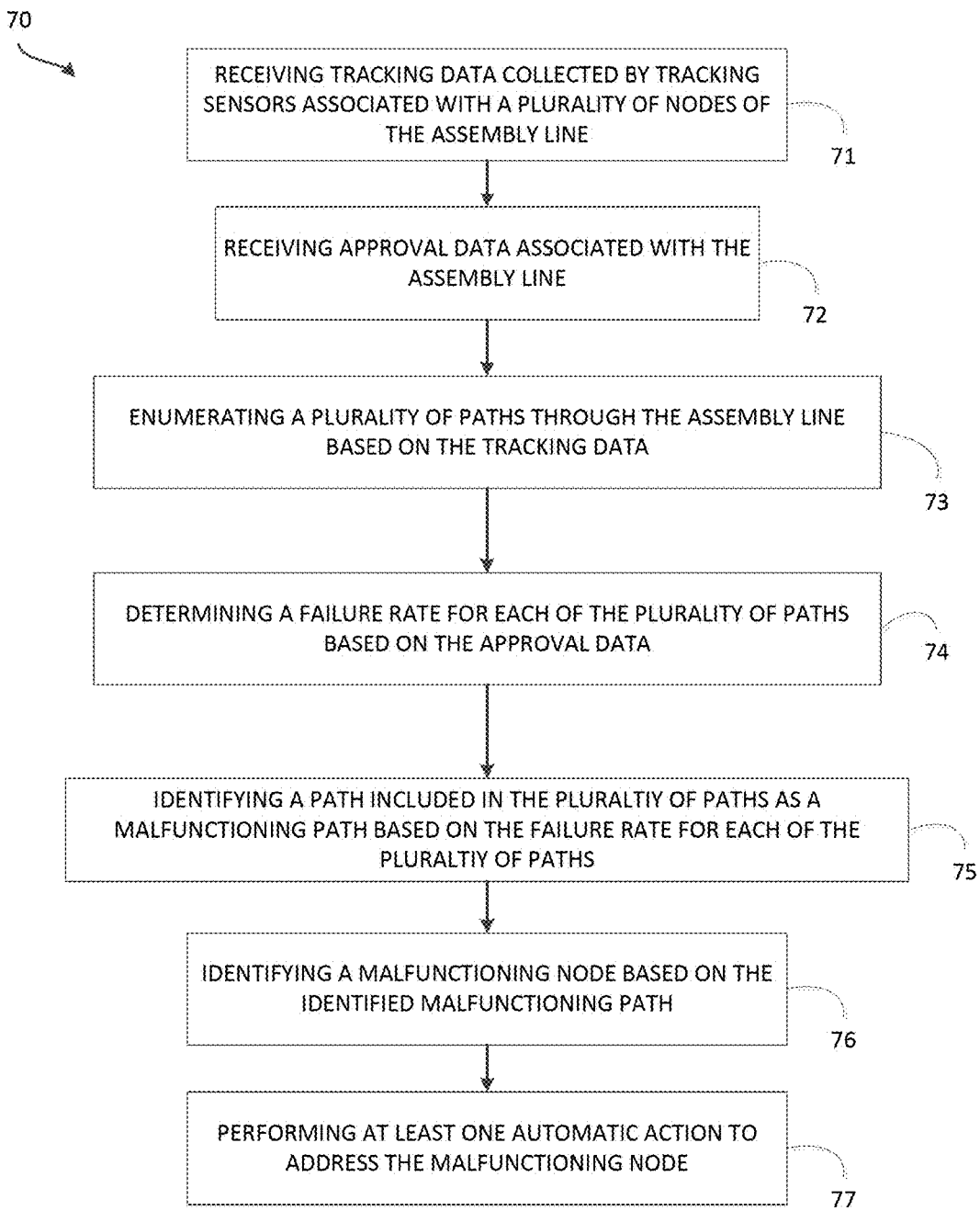
FIG. 5 is a flow chart illustrating a method of performing root cause analysis using the system of FIG. 2.

FIG. 5 illustrates one method 70 for performing root cause analysis. The method 70 includes receiving tracking data collected by the tracking sensors 56 for the assembly line 10 (at block 71). As described above, the tracking data identifies a subset of the plurality of nodes included in the assembly line 10 processing a product produced by the assembly line. In other words, the tracking data identifies a path through the assembly line 10 followed by a product 16 produced by the assembly line. As noted above, a path may include a plurality of edges that link a subset of the plurality of nodes. In some embodiments, the computing device 54 receives the tracking data from the database 52, the tracking sensors 56, or a combination thereof.

The method 70 also includes receiving approval data associated with the assembly line 10 (at block 72). The approval data identifies whether each product 16 produced by the assembly line 10 satisfies or fails one or more approval metrics. In some embodiments, the computing device 54 receives the approval data from the database 52, the tracking sensors 56, or a combination thereof. For example, as described above, when a composite part reaches the fifth stage (e.g., fifth nodes 28A and 28B), the composite part is tested. In particular, the fifth nodes 28A and 28B take one or more measurements or observations of the composite part. Accordingly, the approval data may include the measurements taken by the fifth nodes 28A and 28B, an indication of whether the measurements (and, hence the product 16) pass or fail one or more approval metrics, or a combination thereof. However, in some embodiments, the database 52 or the computing device 54 may determine this data (e.g., by comparing data from the tracking sensors 56 to a metric).

As noted above, in some embodiments, the tracking sensors 56 provide data regarding whether a product passes or fails one or more approval metrics. However, in some embodiments, the database 52 or the computing device 54 may determine this data (e.g., by comparing data from the tracking sensors 56 to a metric).

The method 70 also includes enumerating a plurality of paths through the assembly line based on at least the tracking data (at block 73). As noted above, a path represents a sequence of nodes and connecting edges that a product 16 passes through within the assembly line 10. In some embodiments, the computing device 54 only enumerates those paths produced at least one product 16 that failed one or more of the approval metrics. Accordingly, in some embodiments, the computing device 54 enumerates the paths based on the tracking data and the approval date.

As illustrated in FIG. 5, the method 70 also includes determining a failure rate for each of the plurality of paths based on at least the approval data (at block 74). In some embodiments, the failure rate for a path is the number of products 16 passing through the path that fail one or more approval metrics divided by the total number of products 16 passing through the path. The computing device 54 may also determine a confidence interval and a p-value for each path, such as through the use of a Poisson distribution to handle small sample sizes. For example, in some embodiments, the confidence interval, the p-value, or both may be based on the size of the sample (i.e., the number of total products 16 produced by the assembly line 10) and may account for different sized samples. For example, a sample size of a million products passing through an assembly line may provide more reliable data than a sample size of five products passing through the same edge. In some embodiments, the confidence interval, the p-value, or both are applied as an adjustment to each failure rate. Accordingly, in some embodiments, the computing device 54 identifies a malfunctioning path, as described below, based on the failure rate and the confidence level for each path.

Based on the failure rates for each path, the computing device 54 identifies a path included in the plurality of paths as a malfunctioning (i.e., "bad") path based on the failure rate for each of the plurality of paths (at block 75). For example, the computing device 54 may compare the failure rate of a path to a marginal failure rate (i.e., a threshold rate) to identify whether a particular path is potentially malfunctioning. The threshold rate may be configurable and may be set to an average failure rate for paths or may be set by the manufacturer (e.g., based on internal goals or requirements). When the failure rate of a path exceeds the threshold rate, the computing device 54 identifies the path as a malfunctioning path. Accordingly, in some embodiments, the computing device 54 identifies a subset of the plurality of paths as malfunctioning paths. Any path not identified as a malfunctioning path may be considered a non-malfunctioning path (i.e., a "good" path).

As illustrated in FIG. 5, the method 70 also includes identifying malfunctioning (i.e., "bad") nodes based on the one or more identified malfunctioning paths (at block 76). For example, any node included in a malfunctioning path may be identified as a malfunctioning node. Alternatively or in addition, the computing device 54 may determine a ratio of malfunctioning paths to non-malfunctioning (i.e., "good") paths intersecting or passing through each node. The ratio for each node may then be used to identify malfunctioning nodes. For example, nodes with the greatest ratio of malfunctioning paths to non-malfunctioning nodes or nodes with a ratio greater than a predetermined threshold ratio may be considered likely candidates for malfunctioning nodes.

After identifying one or more malfunctioning nodes, the computing device 54 performs at least one automatic action to address the identified malfunctioning node (at block 77). The computing device 54 may address a malfunctioning node by generating an alert and/or warning (i.e., a notification) and outputting the notification to an operator. The notification may be visual (e.g., a blinking light, illuminating a light, changing the color of an illuminated light, displaying a warning message on a display, and the like), audible (e.g., a warning sound), tactile (e.g., a vibration), or a combination thereof. In some embodiments, the computing device 54 may address a malfunctioning node by automatically adjusting operation of the assembly line 10, such as by shutting down one or more nodes, edges or paths of an assembly line (or the entire assembly line), re-calibrating one or more nodes included in the assembly line, re-calibrating one or more edges connecting nodes included in the assembly line, re-calibrating one or more paths included in the assembly line, or a combination thereof.

Furthermore, in some embodiments, the computing device 54 addresses a malfunctioning node by outputting an identification of the malfunctioning node, a performance ranking of the plurality of nodes, or another form of report that informs an operator of the assembly line 10 of the malfunctioning node and allows the operator to address the situation as needed. For example, in some embodiments, the computing device 54 may output a list of nodes that should be given priority for maintenance, calibration, or the like. The list may include a subset of the plurality of nodes and may include those nodes identified as malfunctioning nodes (e.g., ranked according their ratios as described above or other criteria).

Similarly, in some embodiments, the computing device 54 may address a malfunctioning node by generating a visualization of the assembly line 10. The visualization of the assembly line 10 may visually identify a malfunctioning node, edge, path, or combination thereof. In some embodiments, the data included in the visualization may be color-coded. For example, malfunctioning paths or nodes may be displayed in red while non-malfunctioning paths or nodes may be displayed in green. Similarly, data included in the visualization may be animated (e.g., through flashing). For example, malfunctioning paths or nodes may be flashed while non-functioning paths or nodes may be displayed in a static condition.

The visualization may also visually identify a usage rate for a node, edge, path, or combination thereof, which may identify what nodes, edges, or paths may need adjustment or maintenance. For example, a node that is heavily used may need maintenance before a node that is not heavily used. Similarly, a node that is not being used may indicate that the assembly line should be adjusted. Furthermore, the visualization may visually identify failure rates for paths as described above, ratios for nodes as described above, and other statistics for nodes, edges, paths, or a combination thereof. In some embodiments, the visualization also suggests adjustment to one or more nodes, edges, paths, or a combination thereof.

The automatic action taken by the computing device 54 may also include using machine learning to associate particular failure rates, ratios, or other statistics determined by the computing device 54 with future failures or maintenance. Accordingly, the computing device 54 may develop a model to make these predictions, which can be used to perform predictive and preventive maintenance. For example, the computing device 54 may receive data tracking identified failures or malfunctions occurring within an assembly line and associated repairs. The computing device 54 may this data along with the tracking data and approval data to automatically learn particular failure rates, ratios, or other statistics that may predict the occurrence of these failures or malfunctions and, hence, identify and prevent the failures and malfunctions before they occur.

It should be understood that the computing device 54 may take other actions in response to identifying a malfunctioning node, and the automatic actions described herein are mere examples.

Figure 6:
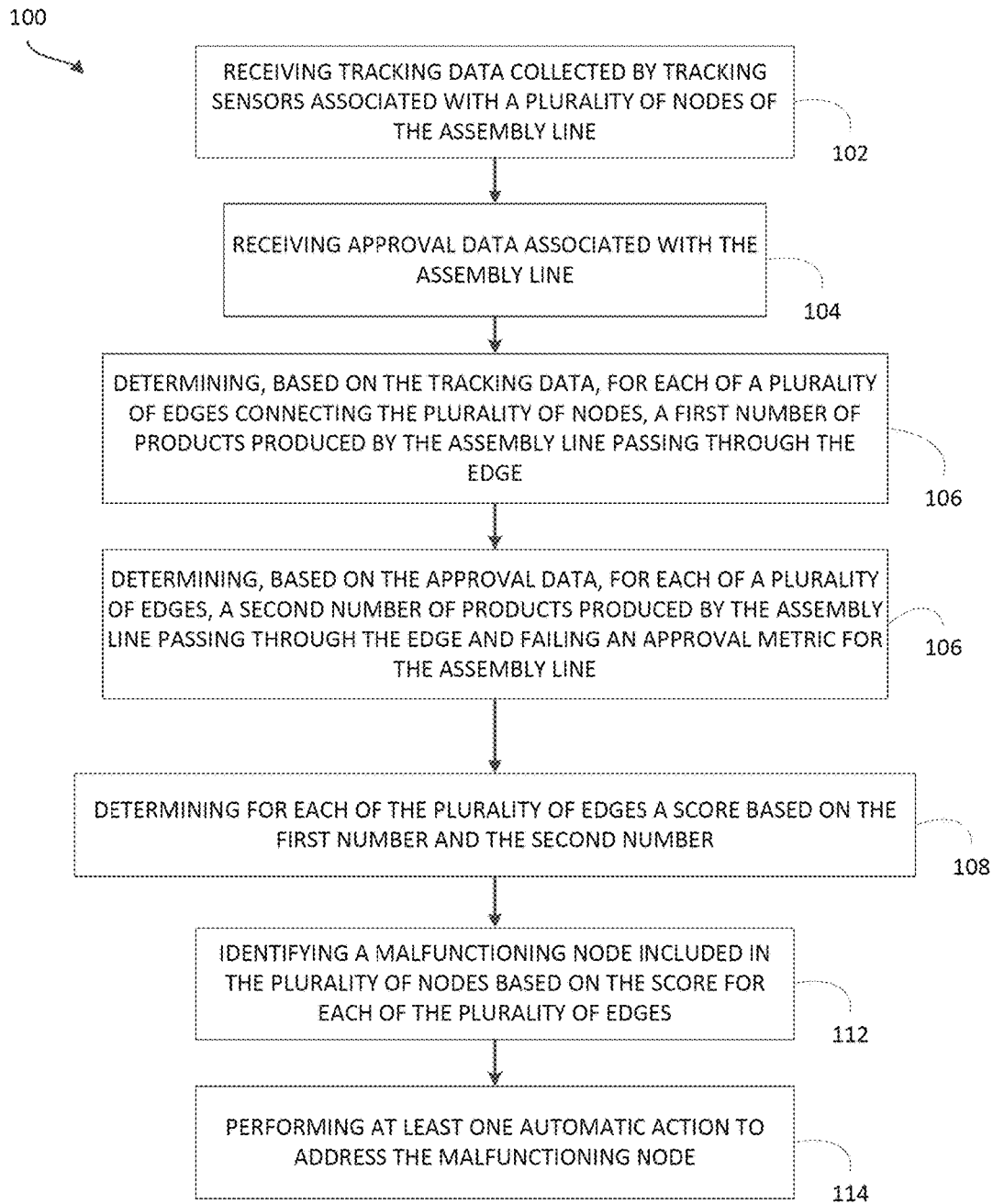
FIG. 6 is a flow chart illustrating another method of performing root cause analysis using the system of FIG. 2.

FIG. 6 illustrates another method 100 for performing root cause analysis. As illustrated in FIG. 6, the method 100 includes receiving tracking data collected by the tracking sensors 56 for the assembly line 10 (at block 102). For example, in some embodiments, the tracking data is collected by at least one tracking sensor 56 associated with each node included in the assembly line 10. As described above, the tracking data identifies a subset of the plurality of nodes included in the assembly line 10 processing a product produced by the assembly line. In other words, the tracking data identifies a path through the assembly line 10 followed by a product 16 produced by the assembly line. As noted above, a path may include a plurality of edges that link a subset of the plurality of nodes. In some embodiments, the computing device 54 receives the tracking data from the database 52, the tracking sensors 56, or a combination thereof.

The method 100 also includes receiving approval data associated with the assembly line 10 (at block 104). As noted above, the approval data identifies whether each product 16 produced by the assembly line 10 satisfies or fails one or more approval metrics. In some embodiments, the computing device 54 receives the approval data from the database 52, the tracking sensors 56, or a combination thereof. For example, as noted above, in some embodiments, the tracking sensors 56 provide data regarding whether a product passes or fails one or more approval metrics. However, in some embodiments, the database 52 or the computing device 54 may determine this data (e.g., by comparing data from the tracking sensors 56 to a metric).

Based on at least the tracking data, the computing device 54 determines, for each of the plurality of edges connecting the plurality of nodes, a first number of products produced by the assembly line 10 passing through the edge (at block 106). Similarly, based on at least the approval data, the computing device 54 determines, for each of the plurality of edges a second number of products produced by the assembly line 10 passing through the edge and failing an approval metric (at block 107). The computing device 54 may determine the first number by identifying the number of unique identifiers tracked by two nodes connected by an edge. For example, when a tracking sensor 56 associated with the first node 20A tracked parts identified by the unique identifiers A1, A2, A3, and A4 and a tracking sensor 56 associated with the second node 22A tracked parts identified by the unique identifiers A2, A3, A4, and A5, the computing device 54 may determine that three unique parts passed through the edge connecting the first node 20A and the second node 22A (i.e., the parts identified by the unique identifiers A2, A3, and A4). Therefore, the computing device 54 sets the first number for this edge to three.

Similarly, to determine the second number, the computing device 54 may determine, based on the approval data, how many of the parts passing through an edge were included in a product 16 produced by the assembly line 10 that failed one or more approval metrics. For example, continuing with the example above for the edge connecting the first node 20A and the second node 22A, when the parts identified by the unique identifiers A2 and A3 passed the approval metric but the part identified by the unique identifier A4 failed the approval metric, the computing device 54 sets the second number for the edge to two. It should be understood that, in some embodiments, the computing device 54 determines the second number and a third number representing the number of products produced by the assembly line 10 passing through the edge and passing the approval metric and uses the second number and the third number to determine the first number (e.g., by adding the second number and the third number).

Figure 7:
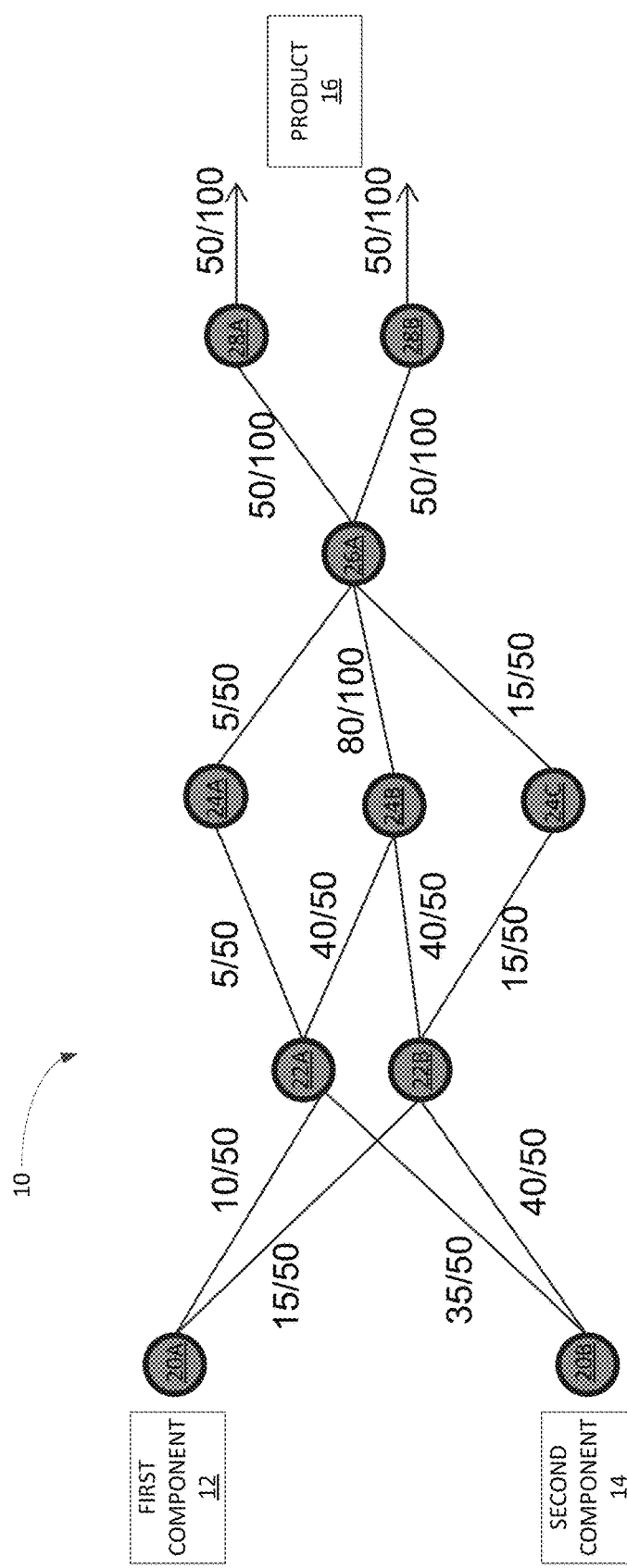
FIGS. 7 and 8 schematically illustrate the assembly line of FIG. 1 with example scores assigned to edges included in the assembly line.
Figure 8:
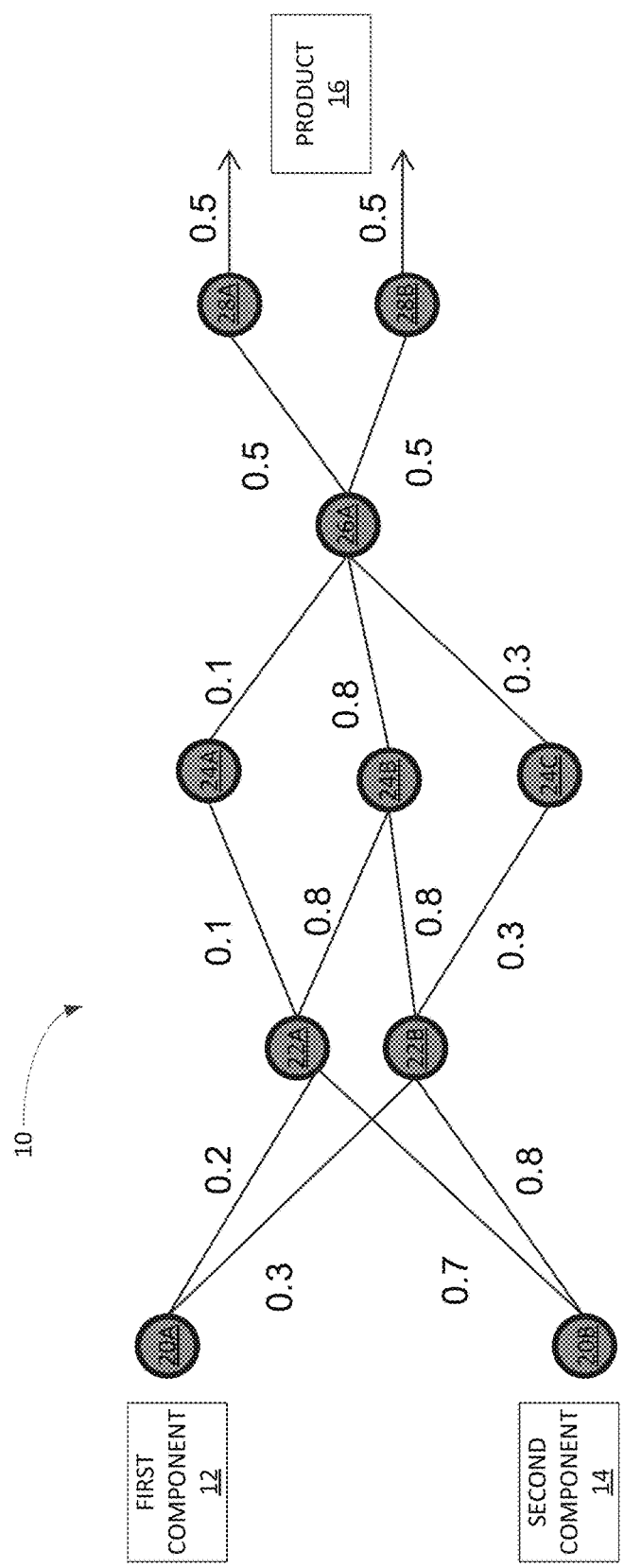

Returning to FIG. 6, the method 100 also includes determining, with the computing device 54, a score for each of the plurality of edges (at block 108). In some embodiments, the score may be based on the first number and the second number determined for an edge. In particular, in some embodiments, the computing device 54 determines the score by dividing the second number by the first number, which provides a failure rate for the edge. For example, when the total number of products passing along a particular edge is fifty products and twenty of those fifty products fail to meet one or more approval metrics, then the score (i.e., the failure rate) for that particular edge is twenty divided by fifty (i.e., 20/50). FIG. 7 illustrates example scores assigned to edges. It is to be understood that FIG. 7 merely illustrates example scores and an assembly line may include different scores. Also, the score may be represented as a ratio, percentage, or other numerical representation (e.g., a decimal). For example, FIG. 8 illustrates the assembly line 10 with the scores from FIG. 7 represented as decimals.

As illustrated in FIG. 6, based on the scores for the plurality of edges, the computing device 54 identifies a malfunctioning node included in the plurality of nodes (at block 112). For example, the computing device 54 may identify malfunctioning nodes by analyzing splitting edges and merging edges. When a node has multiple input edges or multiple output edges, each edge should have a similar score. Accordingly, when output or input edges of a node have different scores, this divergence may identify a malfunction. In particular, when a node along a path is malfunctioning, scores for edges along this path may be affected, which disrupts the balance of scores among output and input edges of a node.

For example, the computing device 54 may identify a malfunctioning node by identifying a plurality of splitting edges (multiple edges output by a single node) included in the plurality of edges, wherein the score of each of the plurality of splitting edges is not the same. It should be understood that the term "same" used in this embodiment of the invention may include similar scores and does not necessarily require identical scores. For example, a score of 0.2 and 0.3 may be considered to be the same. However, a score of 0.2 and 0.8 may not be considered the same. In some embodiments, scores may be considered the same when the scores differ by no more than a predetermined amount or percentage. For example, scores may be considered the same when the scores differ by no more than 10 percent. In other embodiments, scores may be considered the same when the scores fail to pass a statistical hypothesis test (for example, a t-test, a chi-squared test, and the like) where score differences are compared with an overall score variation across the plurality of splitting edges, and the probability of the difference being related to normal variation is estimated.

Figure 9:
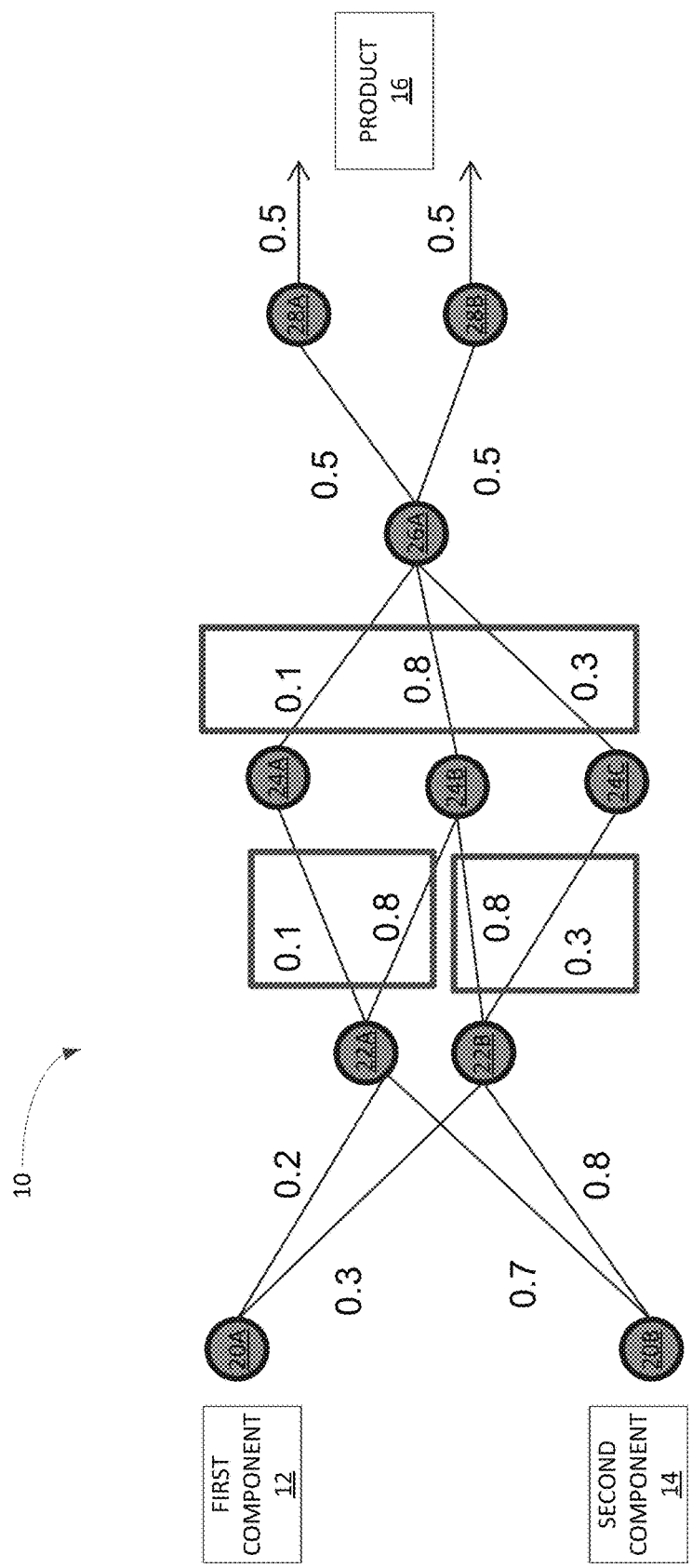
FIG. 9 schematically illustrates the assembly line of FIG. 1 with example scores assigned to nodes included in the assembly line.

In some embodiments, the computing device 54 identifies splitting edges starting from a first node in the assembly line 10 (i.e., first nodes 20A and 20B). However, it should be understood that the computing device 54 may start looking for splitting edges at other locations along the assembly line. As illustrated in FIG. 9, the scores of the splitting output edges of the first node 20A are 0.2 and 0.3, which are generally the same. Similarly, the scores of the splitting output edges of first node 20B are generally the same. However, the splitting output edges of second nodes 22A and 22B are not generally the same. Specifically, the scores for the splitting output edges of the second node 22A are 0.1 and 0.8, and the scores for the output edges of the second node 22B are 0.8 and 0.3.

Once the computing device 54 identifies a plurality of splitting edges, wherein the score of each of the plurality of splitting are not the same, the computing device 54 analyzes subsequent nodes along the assembly line 10 at each stage of the assembly line 10 (i.e., on an output side of the identified splitting edge) to identify a plurality of merging edges and, in particular, a plurality of merging edges, wherein the score of each of the plurality of merging edges is not the same.

Merging edges includes multiple edges input into a single node. For example, as illustrated in FIG. 9, the computing device 54 may analyze the third nodes 24A, 24B, and 24C to identify whether the nodes are associated with merging edges. When a set of nodes are not associated with merging edges, the computing device 54 may look at the next set of nodes. However, when a set of nodes are associated with merging edges, the computing device 54 may identify whether the scores of the merging edges are the same. When the merging edges generally have the same score, the computing device 54 may look at the next set of nodes. Alternatively, when merging edges generally do not have the same scores, the computing device 54 identifies the merging edge with a score greater than the scores of the remaining merging edges and identifies the node connected to the identified merging edge.

For example, as illustrated in FIG. 9, the third nodes 24A, 24B, and 24C merging edges wherein the scores of the merging edges are not the same (i.e., 0.1, 0.8, and 0.3). Also, the third node 24B is associated with the merging edge with the greatest failure rate (i.e., 0.8). Accordingly, in this example, the computing device 54 identifies the third node 24B as a malfunctioning node. Thus, the computing device 54 may use difference failure rates among splitting edges to identify a starting point for identifying a malfunctioning node and may use diverging failure rates among subsequent merging edges to isolate a particular malfunctioning node.

Alternatively or in addition, in some embodiments, the computing device 54 may use the scores for the edges to identify an intersection of malfunctioning edges to identify malfunctioning nodes. For example, for each node in the assembly line, the computing device 54 may determine a ratio for each node that representing a ratio of the number of malfunctioning edges connected to the node to the number of non-malfunctioning edge connected to the node. The computing device 54 may compare the determined ratio for each node to a configurable threshold that distinguishes between malfunctioning and non-malfunctioning nodes. The computed ratios may also be used to rank nodes in an order from greatest ratio to lowest ratio to indicate nodes likely causing failures.

Alternatively or in addition, the computing device 54 may identifies a malfunctioning node by identifying an optimal path through the assembly line 10. For example, the first scores may represent a minimum cost to produce a product 16. In particular, as described above, the first score may represent a failure rate. Therefore, the greater the first score (e.g., the greater the failure rate), the greater the cost to produce a product 16 along a particular edge because more products 16 may be scrapped. As such, the computing device 54 may determine the minimum cost or shortest path to produce the product 16 (e.g., using dynamic programming). Once this path is identified, the computing device 54 may identify one or more nodes not included in the identified path as a malfunctioning node. Similarly, in some embodiments, the computing device 54 may use an inverse of the first scores to identify a set of edges through the assembly line 10 associated with the greatest cost. The computing device 54 may then identify one or more nodes connected to the set of edge as malfunctioning nodes. In some embodiments, the computing device 54 may similarly use the second scores (described below) to identify a minimum (or maximum) path through the assembly line.

Figure 10:
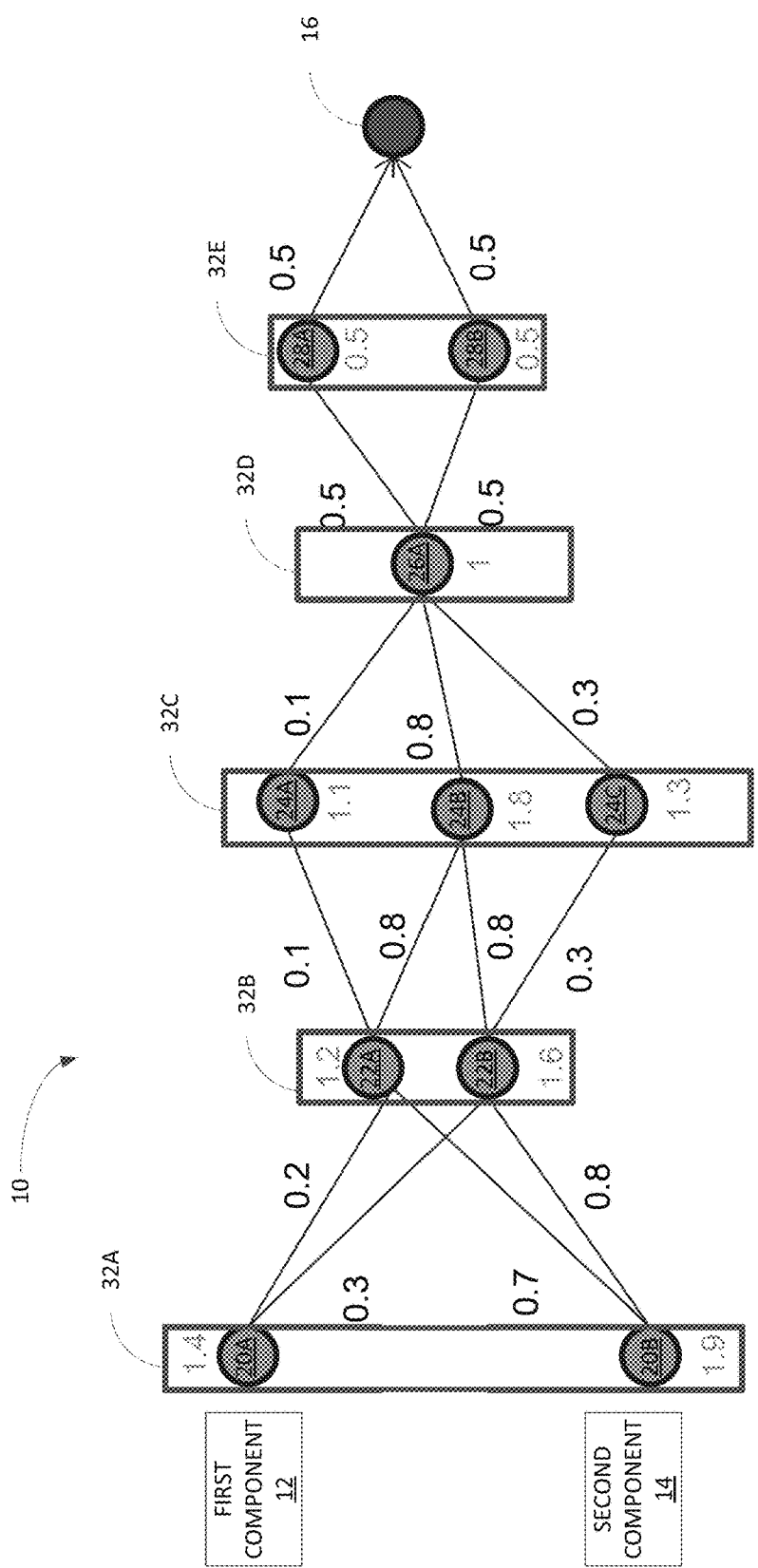
FIG. 10 schematically illustrates splitting edges and merging edges included in the assembly line of FIG. 1.

Alternatively or in addition, the computing device 54 may identify a malfunctioning node by determining a score for each of the plurality of nodes (i.e., a second score as compared to a first score for an edge as described above). The second score may be based on the first score associated with at least one edge connected to the node. In particular, the second score for a node may be based on the first score of an output edge of the node (i.e., an edge connected to the node on an output side of the node) and the second score of a node connected to the output edge (if any), such as a sum of these scores. For example, as illustrated in FIG. 8, the fifth node 28A is connected to one output edge that has a first score of 0.5. No other node connected to this output edge. Therefore, in some embodiments, the second score for the fifth node 28A may be the sum of the first score of the output edge (i.e., 0.5) and the second score of the node on the other end of the output edge (i.e., 0 because there is no such node). In other words, the second score for the fifth node 28A may be 0.5. Similarly, the fourth node 26A is connected to an output edge that connects the fourth node 26A with the fifth node 28A. This output edge has a first score of 0.5. Therefore, the second score for the fourth node 26A may be the sum of the first score of the output edge (i.e., 0.5) and the second score of the fifth node 28A (i.e., 0.5). Hence, the second score for the fourth node 26A may be 1.0. FIG. 10 illustrates a plurality of example second scores associated with each of the plurality of nodes based on the first scores illustrated in FIG. 8 (also repeated in FIG. 10). The second score may be represented as a ratio, percentage, or other numerical representation.

It should be understood that some nodes may have multiple output edges (see, e.g., the fourth node 26A). In these situations, the second score for the node may be determined based on the lowest first score of an output edge. For example, to determine the second score of a particular node, the lowest first score of the output edges may be added to the second score of the node associated with the output edge having the lowest first score. In particular, in the example assembly line 10, second node 22A has two output edges. The first scores of the output edges are 0.1 and 0.8. Therefore, the second score for the second node 22A is set to the sum of 0.1 (i.e., the lowest first score of the output edges) and 1.1 (i.e., the second score of the third node 24A connected to the output edge with the lowest first score). It should be understood that, in other embodiments, the second score may be based on the greatest first score of the output edges. Similarly, in some embodiments, the second score may be based on the average first score of the output edges, the median first score of the output edge, and the like.

Once the computing device 54 identifies the second scores, the computing device 54 identifies one or more malfunctioning nodes based on the second scores. For example, the computing device 54 may analyze the second scores for each stage of the assembly line (e.g., the vertical set of nodes 32A, 32B, 32C, 32D, and 32E as illustrated in FIG. 10) to identify a node that has a second score greater than the second score of each neighboring node in a vertical set of nodes (e.g., on the input side or the output side of the node). When a node has a second score that is greater than the second scores of each node in a neighboring vertical set of nodes, the computing device 54 identifies the node as a malfunctioning node.

For example, within the vertical set of nodes 32C, the second score of third node 24B (i.e., 1.8) is greater than the second scores of each node (e.g., the second node 22A and the second node 22B) within the vertical set of nodes to on the output side of the third node 24B (i.e., the vertical set of nodes 32B). It should be understood that in some embodiments, the computing device 54 may compare second scores within a vertical set to second scores in both neighboring vertical sets or to only one neighboring vertical set. For example, the computing device 54 may compare a second score to second scores within an input vertical set (i.e., a vertical set of nodes on an input side of the node), with an output vertical set, or both.

Returning to FIG. 6, after identifying the malfunctioning node, the computing device 54 performs at least one automatic action to address the malfunctioning node (at block 114). The computing device 54 may address a malfunctioning node by generating an alert and/or warning (i.e., a notification) and outputting the notification to an operator. The notification may be visual (e.g., a blinking light, illuminating a light, changing the color of an illuminated light, displaying a warning message on a display, and the like), audible (e.g., a warning sound), tactile (e.g., a vibration), or a combination thereof. In some embodiments, the computing device 54 may address a malfunctioning node by automatically adjusting operation of the assembly line 10, such as by shutting down one or more nodes, edges or paths of an assembly line (or an entire assembly line), re-calibrating one or more nodes included in the assembly line, re-calibrating one or more edges connecting nodes included in the assembly line, re-calibrating one or more paths included in the assembly line, or a combination thereof.

Furthermore, in some embodiments, the computing device 54 addresses a malfunctioning node by outputting an identification of the malfunctioning node, a performance ranking of the plurality of nodes, or another form of report that informs an operator of the assembly line 10 of the malfunctioning node and allows the operator to address the situation as needed. For example, in some embodiments, the computing device 54 may output a list of nodes that should be given priority for maintenance, calibration, or the like. The list may include a subset of the plurality of nodes and may include those nodes identified as malfunctioning nodes (e.g., ranked according their ratios as described above or other criteria).

Similarly, in some embodiments, the computing device 54 may address a malfunctioning node by generating a visualization of the assembly line 10. The visualization of the assembly line 10 may visually identify a malfunctioning node, edge, path, or combination thereof. In some embodiments, the data included in the visualization may be color-coded. For example, malfunctioning paths or nodes may be displayed in red while non-malfunctioning paths or nodes may be displayed in green. Similarly, data included in the visualization may be animated (e.g., through flashing). For example, malfunctioning paths or nodes may be flashed while non-functioning paths or nodes may be displayed in a static condition.

The visualization may also visually identify a usage rate for a node, edge, path, or combination thereof, which may identify what nodes, edges, or paths may need adjustment or maintenance. For example, a node that is heavily used may need maintenance before a node that is not heavily used. Similarly, a node that is not being used may indicate that the assembly line should be adjusted. Furthermore, the visualization may visually identify failure rates for paths as described above, ratios for nodes as described above, and other statistics for nodes, edges, paths, or a combination thereof. In some embodiments, the visualization also suggests adjustment to one or more nodes, edges, paths, or a combination thereof.

The automatic action taken by the computing device 54 may also include using machine learning to associate particular failure rates, ratios, or other statistics determined by the computing device 54 with future failures or maintenance. Accordingly, the computing device 54 may develop a model to make these predictions, which can be used to perform predictive and preventive maintenance. For example, the computing device 54 may receive data tracking identified failures or malfunctions occurring within an assembly line and associated repairs. The computing device 54 may this data along with the tracking data and approval data to automatically learn particular failure rates, ratios, or other statistics that may predict the occurrence of these failures or malfunctions and, hence, identify and prevent the failures and malfunctions before they occur.

It should be understood that the computing device 54 may take other actions in response to identifying a malfunctioning node, and the automatic actions described herein are mere examples.

Thus, embodiments described herein provide, among other things, methods and systems for performing root cause analysis for assembly lines using path tracking. It should be understood that, in some embodiments, as an assembly line is operated, the methods described above may be periodically repeated (e.g., in real-time or near real-time) to update the scores and rates and, hence, the identified malfunctioning nodes. Also, it should be understood that the methods described above and the alternative provided for each method may be performed separately or in a combination to identify malfunctioning nodes. For example, multiple methods may be performed and the results may be compared to more accurately identify malfunctioning nodes. Also, in some embodiments, the number of paths, edges, or both analyzed by the methods described herein may be reduced by grouping similar paths or similar edges together. Reducing the number of paths, edges, or both may reduce the complexity of the methods and the resource or time constraints associated with the methods. In some embodiments, paths, edges, or both may be grouped or clustered using known algorithms to reduce the magnitude of data. It should also be understood that the methods and systems described herein may be used to analyze an entire assembly line or a portion of an assembly line.

Various features and advantages of the described embodiments are set forth in the following claims.

What is claimed is:

1. A method for performing root cause analysis for an assembly line including a plurality of nodes, the method comprising:
receiving tracking data collected by one or more tracking sensors associated with the assembly line, the tracking data identifying a subset of the plurality of nodes processing a product produced by the assembly line,
receiving approval data associated with the assembly line, the approval data identifying whether each product produced by the assembly line fails an approval metric,
enumerating, with an electronic processor, a plurality of paths through the assembly line based on the tracking data,
determining, with the electronic processor, a failure rate for each of the plurality of paths based on the approval data,
identifying, with the electronic processor, a malfunctioning path included in the plurality of paths based on the failure rate for each of the plurality of paths,
identifying, with the electronic processor, a malfunctioning node based on the malfunctioning path, and
performing an automatic action to address the malfunctioning node.

2. The method of claim 1, wherein enumerating the plurality of paths includes enumerating a plurality of paths through the assembly line producing at least one product failing the approval metric.

3. The method of claim 1, wherein determining the failure rate for each of the plurality of paths includes, for a path included in the plurality of paths, dividing a first number of products passing through the path and failing the approval metric by a second number of products passing through the path.

4. The method of claim 1, further comprising determining a confidence level for each of the plurality of paths using a Poisson distribution and wherein identifying the malfunctioning path includes identifying the malfunctioning path the failure rate for each of the plurality of paths and the confidence level for each of the plurality of paths.

5. The method of claim 1, wherein identifying the malfunctioning path includes identifying a path included in the plurality of paths, wherein the failure rate of the path exceeds a threshold rate.

6. The method of claim 1, wherein identifying the malfunctioning node includes determining a ratio for each of the plurality of nodes, the ratio for a node including a first number of paths from the plurality of paths including the node and identified as the malfunctioning path and a second number of paths from the plurality of paths including the node and identified as a non-malfunctioning path, and identifying a node included in the plurality of nodes having a ratio exceeding a threshold ratio as the malfunctioning node.

7. The method of claim 1, wherein performing the automatic action includes automatically adjusting operation of the assembly line.

8. The method of claim 7, wherein automatically adjusting operation of the assembly line includes at least one selected from the group consisting of shutting down one or more nodes included in the plurality of nodes, re-calibrating a node included in the plurality of nodes, and re-calibrating at least a portion of a path included in the plurality of paths.

9. The method of claim 1, wherein performing the automatic action includes outputting an identification of the malfunctioning node.

10. The method of claim 1, wherein performing the automatic action includes outputting a list of a subset of the plurality of nodes, the list including the malfunctioning node.

11. The method of claim 1, wherein performing the automatic action includes generating and outputting a visualization of at least a portion of the assembly line visually identifying the malfunctioning node.

12. A system for performing root cause analysis for an assembly line including a plurality of nodes, the system comprising:
a database; and
a computing device having an interface for communicating with the database, a computer-readable medium for storing instructions, and an electronic processor for executing the instructions stored in the computer-readable medium, wherein the electronic processor executes the instructions stored in the computer-readable medium to
receive, from the database through the interface, tracking data from one or more tracking sensors associated with the assembly line, the tracking data identifying a subset of the plurality of nodes processing a product produced by the assembly line,
receive, from the database through the interface, approval data associated with the assembly line, the approval data identifying whether each product produced by the assembly line fails an approval metric,
determine based on the tracking data, for each of a plurality of edges connecting the plurality of nodes, a first number of products produced by the assembly line passing through the edge,
determine based on the approval data, for each of the plurality of edges, a second number of products product by the assembly line passing through the edge and failing the approval metric,
determine, for each of the plurality of edges, a score based on the first number for the edge and the second number for the edge,
identify a malfunctioning node included in the plurality of nodes based on the score for each of the plurality of edges, and
perform an automatic action to address the malfunctioning node.

13. The system of claim 12, wherein the score includes the second number divided by the first number.

14. The system of claim 12, wherein the electronic processor executes the instructions to identify the malfunctioning node by
identifying a plurality of splitting edges included in the plurality of edges, wherein the score of each of the plurality of splitting edges is not the same;
identifying a plurality of merging edges included in the plurality of edges on an output side of the plurality of splitting edges, wherein the score of each of the plurality of merging edges is not the same; and
identifying the malfunctioning node by identifying a node connected to one of the plurality of merging edges, the score of the one of the plurality of merging edges being greater than the each score of the remaining plurality of merging edges.

15. The system of claim 12, wherein the electronic processor further executes the instructions to determine a second score for each of the plurality of nodes, the second score for a node including a sum of a lowest first score of an edge of the plurality of edges connected to the node on an output side of the node and the second score of a node connected to the edge.

16. The system of claim 15, wherein the electronic processor executes the instructions to identify the malfunctioning node by identifying a node of the plurality of nodes wherein the second score of the node is greater than the second score of each neighboring node included in the plurality of nodes on an input side of the node.

17. The system of claim 12, wherein the electronic processor executes the instructions to identify the malfunctioning node by identifying an optimal path through the assembly line based on the score for each of the plurality of edges.

18. A method of performing root cause analysis for an assembly line including a plurality of nodes, the method comprising:
receiving tracking data from one or more tracking sensors associated with the assembly line, the tracking data identifying a subset of the plurality of nodes processing a product produced by the assembly line;
receiving approval data associated with the assembly line, the approval data identifying whether each product produced by the assembly line fails an approval metric;
determining based on the tracking data, with an electronic processor, for each of a plurality of edges connected to at least one of the plurality of nodes, a first number of products produced by the assembly line passing through the edge;
determining based on the approval data, with the electronic processor, for each the plurality of edges a second number of products produced by the assembly line passing through the edge and failing the approval metric;
determining, with the electronic processor, for each of the plurality of edges, a first score based on the first number of the edge and the second number of the edge;
determining, with the electronic processor, for each of the plurality of nodes, a second score based on the first score associated with at least one edge connected to the node;
identifying, with the electronic processor, a malfunctioning node included in the plurality of nodes based on the second score for each of the plurality of nodes; and performing an automatic action to address the malfunctioning node.

19. The method of claim 18, wherein determining, for each of the plurality of nodes, the second score includes determining, for each of the plurality of nodes, a sum of a lowest first score of an edge of the plurality of edges connected to the node on an output side of the node and the second score of a node connected to the edge.

20. The method of claim 19, wherein identifying the malfunctioning node includes identifying a node of the plurality of nodes wherein the second score of the node is greater than each neighboring node of the plurality of nodes on an input side of the node.

* * * * *